United States Patent [19]

Oudet et al.

[11] Patent Number: 4,516,064

[45] Date of Patent: * May 7, 1985

[54] STEPPER MOTOR CONTROL DEVICE

[75] Inventors: Claude Oudet; Danielle Régnier, both of Besancon, France

[73] Assignee: Portescap, La Chaux-de-Fonds, Switzerland

[ * ] Notice: The portion of the term of this patent subsequent to Nov. 15, 2000 has been disclaimed.

[21] Appl. No.: 466,542

[22] Filed: Feb. 15, 1983

[30] Foreign Application Priority Data

Feb. 16, 1982 [CH] Switzerland ............................ 958/82

[51] Int. Cl.³ .............................................. H02K 29/02
[52] U.S. Cl. .................................... 318/696; 368/157; 318/685
[58] Field of Search ................. 318/696, 685; 368/157

[56] References Cited

FOREIGN PATENT DOCUMENTS

2082806 8/1981 United Kingdom .

Primary Examiner—J. V. Truhe
Assistant Examiner—Saul M. Bergmann
Attorney, Agent, or Firm—Cushman, Darby & Cushman

[57] ABSTRACT

The present control device is used in connection with a diphase or polyphase stepper motor in which the coils of two phases ($b_i$, $b_j$) are not simultaneously supplied with driving current. A commutation circuit CC is adapted to connect the coils to a voltage source V or to a detection circuit CD. A logic control circuit $CL_1$, $CL_2$, $CL_3$, itself controlled by a clock signal source $G_1$ and by a generator of programmed control pulses PG, supplies control signals to said circuits CC and CD. The control device provides a feedback control of the motor as a function of the speed and the position of the rotor at various instants of the control cycle in accordance with a predetermined program so as to assure perfectly reliable operation of the motor with a minimum of electric energy even for motors manufactured with rather wide manufacturing tolerances.

3 Claims, 9 Drawing Figures

STEPPER MOTOR CONTROL DEVICE

The present invention relates to a control device for an electric diphase or polyphase stepper motor of the type comprising a permanent magnet rotor and at least two separate magnetic stator circuits each coupled with at least one electric coil. More particularly, the invention relates to a control device comprising an electric power source, adapted to be connected through a commutation circuit to the coils of each of the stator circuits for supplying said coils with current pulses, a pulse generator circuit controlled by a clock signal source for providing programmed control pulses being part of at least one programmed pulse series, a detection circuit at least one input of which is adapted to be connected through the said commutation circuit to the respective coils of each of the said separate stator circuits. The detection circuit comprises at least one integrating circuit provided with a reset device, at least a first comparator circuit for comparing at least temporarily the output signal of the said integrator circuit with a first position reference value and providing a corresponding output signal and a logic control circuit connected by its inputs to the said clock signal source, to said pulse generator circuit and to the outputs of said detection circuit. The logic control circuit is arranged to supply through its outputs commutation control signals to the inputs of said commutation circuit and detection control signals to said detection circuit.

Such a control device is described in U.S. patent application Ser. No. 305,626 (International patent application PCT/CH 81/00011). The object thereof is in particular to assure the operation of a stepper motor of the above mentioned type more particularly of a motor for watches or clocks, by means of current pulses of limited duration. The device allows to operate the motor with generally shorter current pulses, at a given pulse height, than the maximum pulse length necessary to assure the operation in the most critical case which can occur in a series of motors due to the differences in the magnetic, mechanic and electric characteristics of these motors. The device thus allows to save electrical energy and to increase accordingly the life of the batteries used for the power supply of such motors.

It appears however, that the reduction of energy consumption obtained by means of the known device is rather limited and that the manufacturing tolerances must be relatively narrow to assure a satisfactory operation of the motor.

A primary object of the invention is to provide a control device for the above mentioned type of motors, allowing on the one hand to reduce to a very minimum the electrical power consumption of the motor and, on the other hand, to allow the manufacturing tolerances of the motors to become larger while assuring a perfectly reliable operation of the stepper motor.

To this effect, the stepper motor control device according to the invention comprises a detection circuit which includes at least a second comparator circuit to compare at least temporarily a speed signal provided by the electric coils of the motor with a speed reference value, the logic control circuit being adapted to control the commutation circuit in accordance with the output signals of said comparator circuits so as to supply at predetermined times driving pulses of predetermined duration to the motor in accordance with a desired mode of operation of the motor.

In a preferred embodiment, the detection circuit comprises a third comparator circuit arranged for comparing the output signal of the integrator circuit with a second position reference value, the logic control circuit being arranged for controlling the commutation circuit in order to supply, if necessary, at certain times breaking current pulses to the motor.

Such a control device allows to operate the motor with a minimum of electrical energy and still assures that at each driving pulse the rotor effects one and only one step. Furthermore, substantial deviations from the magnetic, mechanic and electric characteristics of the motors become acceptable without affecting the perfect operation of the motors.

The invention will be better understood at the light of the following description of a particular embodiment given by way of example and illustrated by the attached drawings in which.

Figure 1:
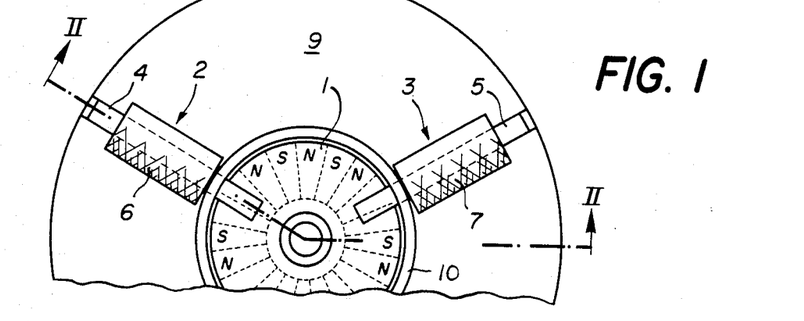
FIG. 1 is a top view of a motor with permanent magnet rotor of the type which can be used in connection with the control device of the invention.
Figures 2, 3:
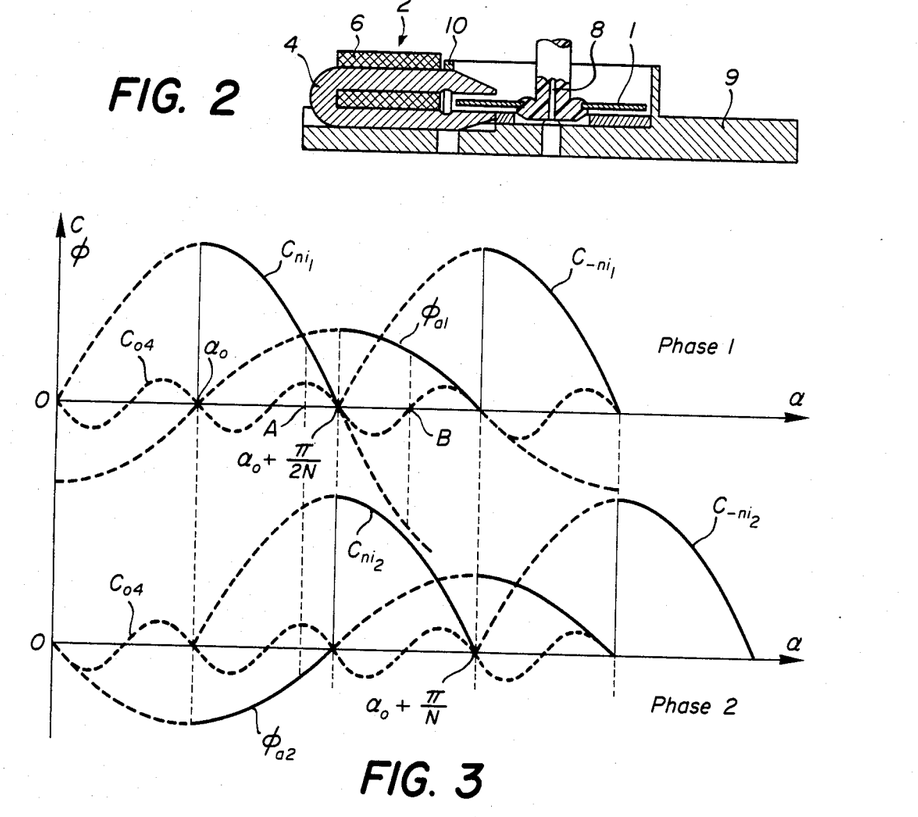
FIG. 2 is a sectional view of the motor along broken line II—II of FIG. 1.
FIG. 3 is a diagram of the fluxes and torques which appear in an ideal motor according to FIGS. 1 and 2 working in a diphase mode, as a function of the angular position of the rotor.

The motor shown in FIGS. 1 and 2 comprises a disk-shaped rotor 1, axially magnetized in order to present on each of its faces alternatively positive and negative magnetic poles. The parts separated by dotted lines and marked N and S, respectively, represent the pulse appearing on the upper surface of the multipolar rotor magnet, which in the present example has $N=10$ pairs of poles. FIG. 1 further shows two stator elements 2 and 3 forming separate magnetic stator circuits and comprising each a U-shaped part 4, 5, respectively, of a magnetically permeable material, the free ends of the U-shaped members forming the polar parts of the corresponding magnetic circuit. Respective electric coils 6, 7 are mounted on one of the branches of each U-shaped member and are connected to a control device not shown in FIGS. 1 and 2.

The shaft 8 of the rotor and the stator elements are mounted on a supporting plate 9, the U-shaped members engaging in grooves of said plate and being maintained by an annular retaining part 10 made integral with the supporting plate 9.

The stator elements shown in FIGS. 1 and 2 extend radially and are arranged in such a way that the rotor poles pass through the air gap of the polar parts of these stator elements. The angular distance between the plans of symmetry of the respective U-shaped members is $\overline{\alpha}=117°$ and the corresponding electrical angle $N\overline{\alpha}=1170°=3\times360°+90°$.

The control device according to the invention is adapted to control a motor of the type described above in relation with FIGS. 1 and 2, by providing electric current pulses alternatively to the coils of the magnetic circuits associated with the two phases according to a diphase operation mode which is well known in the art. The two phases are hereafter designated by Phase 1 and Phase 2 and the corresponding coils by $b_1$ and $b_2$ (indicated by reference numerals 6 and 7 in FIG. 1), it being understood that generally $b_1$ and $b_2$ can each be constituted by more than one coil associated to an equal or smaller number of magnetic stator circuits.

FIG. 3 shows the variations of the fluxes and the torques for each of the Phases 1 and 2 of the stepper motor considered as ideal, as a function of the angle of rotation $\alpha$ of the rotor thereof. The rest position from which the rotor starts its rotation at each step has been designated by $\alpha_0$ and it corresponds to an extremum of the torque due to the current in phase 1. This torque $Cni_1$ is produced by $ni_1$ ampere-turns, in other words by a current $i_1$ applied to coil $b_1$ supposed to have n turns of wire. When current $i_1$ is applied, the rotor proceeds under the effect of this torque and stabilizes in a point $\alpha_0 + \pi/2N$ which is the equilibrium position defined by the detent torque $C_{04}$ shown in FIG. 3. The detent torque $C_{04}$ is of purely magnetic origin and acts on the rotor in the absence of current. It has a frequency which is four times the one of the torque due to the current. The flux induced by the rotor movement in the core of the other coil $b_2$ during this first step, follows the curve $\phi_{a2}$ shown in FIG. 3. It is assumed that the driving current $i_1$ is constant and maintained until the instant at which the rotor passes through the equilibrium position $\alpha_0 + \pi/2N$.

To effect a further step, coil $b_2$ is supplied with current in a similar manner, coil $b_1$ being not supplied during this time. When $ni_2$ ampere-turns are applied to coil $b_2$, the rotor receives a torque $Cni_2$ and turns further by an angle of $\pi/2N$ coming to a stop at the next equilibrium position $\alpha_0 + \pi/N$. During this rotation a flux $\phi_{a1}$ is induced by the rotor in coil $b_1$.

To effect the following step, coil $b_1$ is supplied with a current $-i_1$, which means a current of opposite polarity with respect to the one which had been applied at $\alpha_0$. This provides a torque designated by $C-ni_1$, coil $b_2$ remaining unsupplied during the same period. Finally, to effect the fourth step of this cycle, coil $b_2$ is supplied with a current $-i_2$ and produces a torque $C-ni_2$. The operation is repeated similarily for each cycle of four steps the motor being supplied at the point $\alpha_0 + 2\pi/N$ for the following cycle in the same way as at $\alpha_0$ and furtheron with a periodic repetition at intervals of $2\pi/N$.

The principle of operation as described above is modified by the use of a control device according to the invention on the basis of the following considerations.

It is known that it is not necessary to maintain the driving current during the whole duration of the rotation of the rotor from one rest position to the following rest position but that said following rest position can be reached by a substantially shorter electrical pulse supplied to the motor, thanks to the kinetic energy of the rotor and the presence of torque $C_{04}$ which acts in the direction of the rotor movement during the second half of the angle of rotation corresponding to one step. It has thus been proposed to interrupt the control pulse as soon as the rotor has reached a certain position such as for instance point A indicated in FIG. 3. To this effect, the voltage induced in the coil which is not supplied during a given step and in which the magnetic flux varies for example in accordance with $\phi_{a2}$ is used to detect the instant at which the integral of this voltage reaches a given reference value, corresponding for instance to point A, at which the driving current is cut off.

It appears however, that when motors are manufactured in large series, they vary rather substantially in their characteristics, which can lead to a shifting of the position of stable equilibrium and to a distorsion of the curve representing the detent torque with respect to the ideal case of a sinusoidal variation as represented in FIG. 3. When the rest position is actually shifted from the theoretical position, the starting point of the integration of the induced signal is also shifted and, as a result, the instant when the current is cut off becomes considerably different from the theoretical case. Furthermore, the variations in the magnetic, mechanic and electric characteristics from one motor to the other require a rather large security margin in the duration of the current pulse to guarantee that the step is effected in the most unfavorable case, so that the reduction in electrical energy consumption is rather limited. On the other hand, the motors which are controlled by such a device, can have a tendency to effect two steps in place of one, since the energy given to the rotor can for certain motors of the same series be sufficient to drive the rotor over the next equilibrium position and to allow the rotor to reach the next following rest position.

To improve the reliability of the operation, one solution would be to make a rather narrow selection among the motors manufactured in large series, with respect to their characteristics; this would however considerably increase the manufacturing costs per selected motor. Theoretically it would also be possible to individually adjust each control device, such a step being of course inapplicable for large series production.

The solution according to the invention consists in providing a feedback control of the motor with reference to the position and the speed of the rotor in accordance with a given time schedule.

Figure 4:
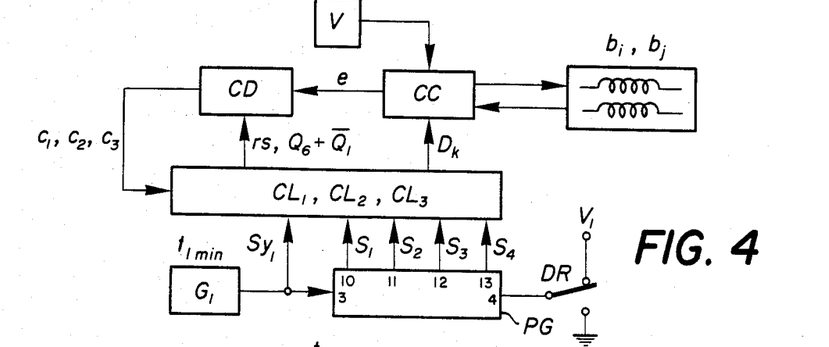
FIG. 4 is a block diagram of one embodiment of the control device of the invention.

FIG. 4 shows a block diagram of one embodiment of the control device of the invention.

The coils designated $b_i$ and $b_j$ represent one or more coils associated respectively with each of the different phases of the motor and thus coupled with separate magnetic circuits. In the case of the diphase motor described above by way of example, the coils associated with Phases 1 and 2 will be connected by means of a commutation circuit CC either to a power supply V or to a detection circuit CD. The connection will be designated by a sign + when it corresponds to the flow of a supply current in a first direction or to a voltage induced in a first direction, while a sign − will designate a connection by which the current or the induced voltage are in the opposite direction. Furthermore, $b_i$ and $b_j$ will represent the coils associated with Phase 1 or the coils associated with Phase 2 depending on the state of the control cycle, so that i and j can take the values ±1 and ±2. Accordingly, the connection of the coils in the four states 1, 2, 3, 4 of the control cycle can be represented by the following table:

| states | coils | |
|---|---|---|
| | $b_i$ | $b_j$ |
| 1 | $b_{+1}$ | $b_{+2}$ |
| 2 | $b_{+2}$ | $b_{-1}$ |
| 3 | $b_{-1}$ | $b_{-2}$ |
| 4 | $b_{-2}$ | $b_{+1}$ |

In the diagram of FIG. 4, the commutation circuit CC delivers, at least temporarily, a signal e representing the voltage induced in either one of the coils, and supplies the signal to a detection circuit CD supplying in turn logic signals $c_1$, $c_2$, $c_3$ to a logic control circuit $CL_1$, $CL_2$, $CL_3$.

A clock signal source $G_1$ supplies pulses $Sy_1$ with a duration of $t_{1min}$, for instance $t_{1min} = 2.44$ msec, and a period of T, for instance T = 1 sec, to the logic control circuit and to a pulse generator PG. The latter produces programmed control pulses $S_1$, $S_2$, $S_3$, $S_4$ representing a programmed series in which the pulses $S_1$, $S_2$, $S_3$, $S_4$ having each a duration T are each triggered by the leading edge of a corresponding pulse $Sy_1$ and appear for instance in the order $S_1$, $S_2$, $S_3$, $S_4$.

The pulse generator PG can be realized by an integrated circuit SANYO PMM 8713, the terminals 10 to 13 of which provide the pulses $S_1$ to $S_4$, the pulses $Sy_1$ being applied to terminal 3 of this circuit. Terminal 4 is connected to a switch DR allowing to define the direction of rotation of the motor by applying either a voltage $V_1$ for instance $V_1 = 5$ Volts, or a voltage 0, i.e. ground potential to this input of PG. Depending on the position of switch DR, the pulses $S_1$, $S_2$, $S_3$, $S_4$ will occur in this order, which corresponds to one direction of rotation or in the reversed order, i.e. $S_4$, $S_3$, $S_2$, $S_1$ which corresponds to the opposite direction of rotation. The control pulses $S_1$ to $S_4$ are applied to logic circuit $CL_1$, $CL_2$, $CL_3$ which delivers at its output commutation control signals $D_k$, namely $D_1$ to $D_4$, $D_6$ to $D_9$ and $D_{10}$ to $D_{13}$ to the commutation circuit. The logic control circuit further supplies detection control signals namely rs and $Q_6 + \overline{Q}_1$ to the detection circuit.

Figure 5:
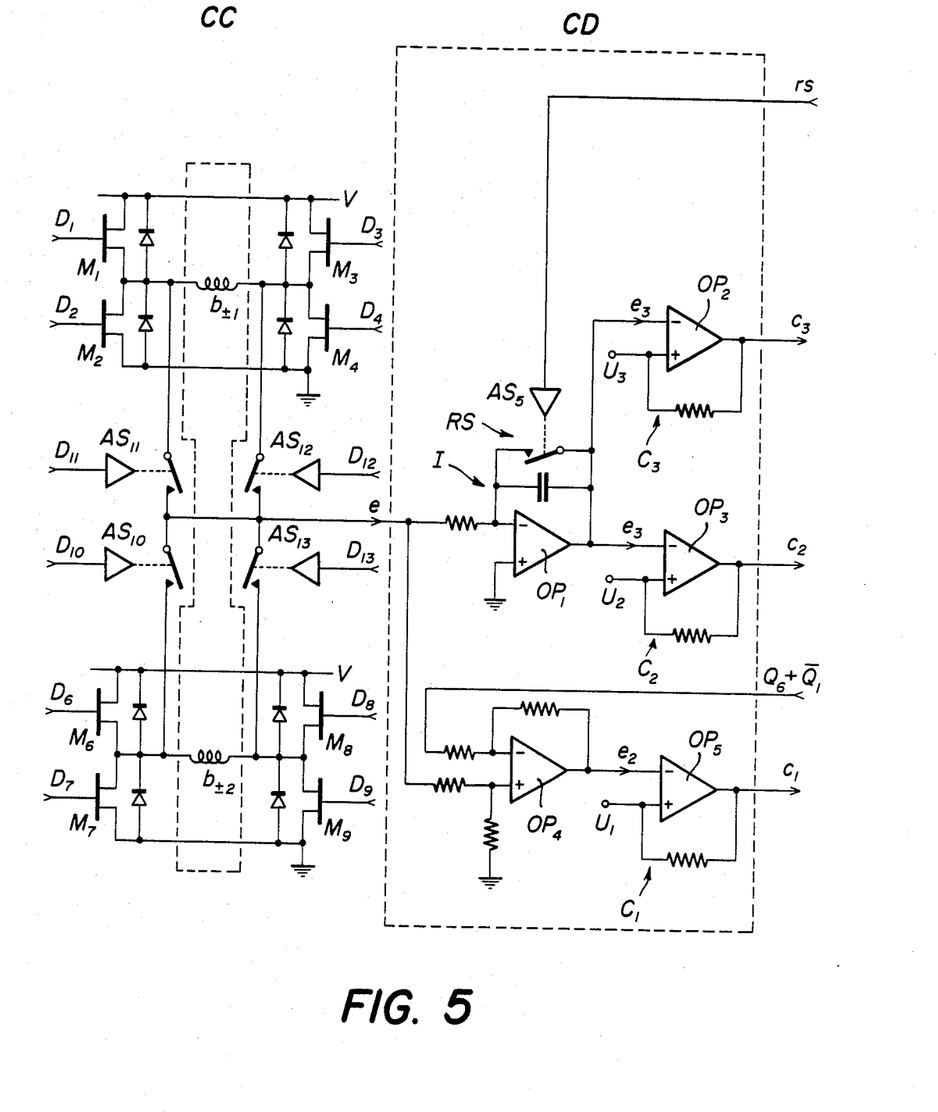
FIGS. 5 to 7 are more detailed diagrams of the electrical circuits of certain parts of the device according to FIG. 4.

FIGS. 5 to 8 show in more detail the embodiment of the invention corresponding to FIG. 4. More particularly, FIG. 5 shows the motor coils $b_{\pm 1}$, $b_{\pm 2}$, the commutation circuit CC and the detection circuit CD. Each coil can be connected in one direction or in the opposite direction to the terminals of a power supply V by means of corresponding MOS transistors $M_1$ to $M_4$ and $M_6$ to $M_9$. The power supply V provides for instance a voltage of 1.5 Volts and has one of its terminals connected to ground. It is to be noted that the coils can also be short-circuited through the above mentioned MOS transistors. The state of conduction of these transistors is controlled by respective commutation control signals $D_1$ to $D_4$ and $D_6$ to $D_9$, supplied by the logic control circuit.

Four additional switches of the type "analog switch" designated by $AS_{11}$ to $AS_{13}$ and controlled by respective commutation control signals $D_{11}$ to $D_{13}$ allow to connect either one of the coils in either direction to the input of detection circuit CD. At the input of CD thus appears a signal e corresponding to the electro-motive force induced in these coils.

The detection circuit CD comprises an integrator circuit I which includes an operational amplifier $OP_1$ and a capacitor of about 0.06 μF connected between the negative input terminal and the output terminal of $OP_1$ in accordance with the diagram of FIG. 5. The integrator I can be reset to zero by means of a device RS realized preferably by another analog switch $AS_5$. Switch $AS_5$ is controlled by a detection control signal rs delivered to circuit CD. When signal e is applied to the input of integrator circuit I the same delivers a signal $e_3$ to the inputs of two comparator circuits $C_2$ and $C_3$. These comparator circuits are realized by operational amplifiers designated respectively by $OP_3$ and $OP_2$, respective reference voltages $U_2$ and $U_3$ being applied to one input of the operational amplifiers. At the output of comparators $C_2$ and $C_3$ appear corresponding logic signals $c_2$ and $c_3$.

Signal e is also applied to a first input of an operational amplifier $OP_4$ representing an inhibition device. Inhibition periods are defined by a detection control signal $Q_6 + \overline{Q}_1$ which is applied at a second input of $OP_4$. Outside of these periods a signal $e_2$ appears at the output of $OP_4$ and is applied to an input of a comparator circuit $C_1$. Comparator circuit $C_1$ is realized by an operational amplifier $OP_5$ to one input of which a reference voltage $U_1$ is applied. At the output of $C_1$ appears a logic signal $c_1$.

Figure 6:
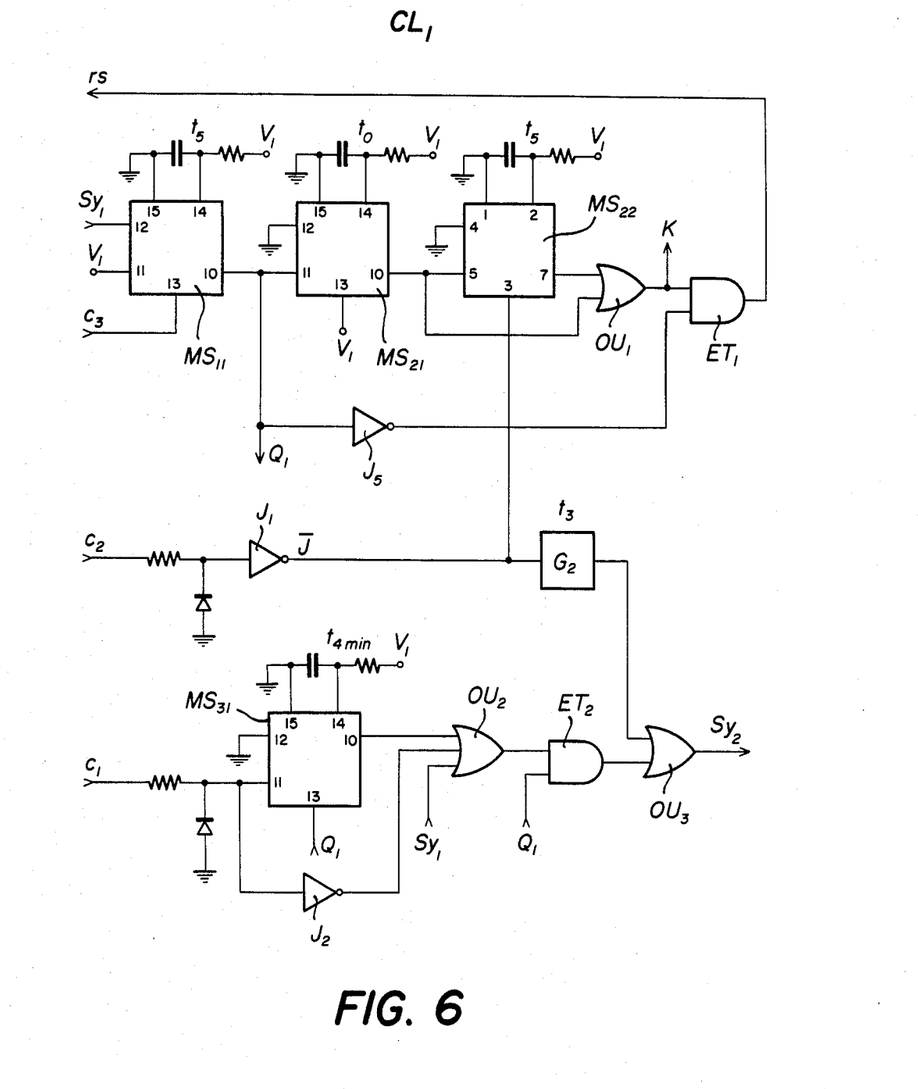

FIG. 6 shows a first portion $CL_1$ of the logic control circuit. Signal $c_3$ is applied to terminal 13 of a monostable multivibrator circuit $MS_{11}$ realized by one part of an integrated circuit HEF 4528 BP of the French manufacturer RADIO TECHNIQUE COMPELEC and by an outer RC-circuit connected to terminals 14, 15 of this integrated circuit. $MS_1$ defines a time interval $t_5$ of about 12 msec. The voltage $V_1$ is applied to terminal 11 of the before mentioned integrated circuit, while signals $Sy_1$ and $c_3$ are applied to terminals 12 and 13, respectively. An output signal $Q_1$ appears at terminal 10 of this circuit.

Figure 7:
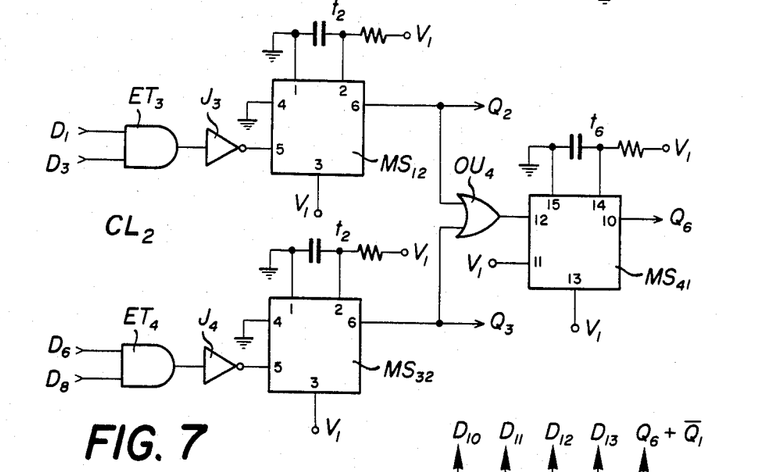

Another portion of the same integrated circuit is used to realize a monostable multivibrator $MS_{12}$ represented in FIG. 7 and, similarly, portions of three further circuits HEF 4528 BP are used to realize respective monostable multivibrators $MS_{21}$ and $MS_{22}$, $MS_{31}$ and $MS_{32}$ as well as $MS_{41}$, the two last of these multivibrators being shown on the diagram of FIG. 7. Multivibrators $MS_{12}$, $MS_{21}$, $MS_{22}$, $MS_{31}$, $MS_{32}$ and $MS_{41}$ define respectively time intervals $t_2 = 0.49$ msec, $t_0 = 0.12$ msec, $t_5$, $t_{4min} = 1.46$ msec, $t_2$, and $t_6 = 0.61$ msec. It is to be noted that multivibrators $MS_{11}$ and $MS_{22}$ operate substantially as bi-stable multivibrators due to the fact that cut off signals $c_3$ and $\overline{J}$ appear generally at their respective input terminals 13 and 3 before the end of interval $t_5$.

The connections of the monostable circuits and the logic elements used, namely the OR-gates $OU_1$, $OU_2$, $OU_3$ and $OU_4$, the AND-gates $ET_1$, $ET_2$, $ET_3$ and $ET_4$ as well as the inverters $J_1$, $J_2$, $J_3$, $J_4$ and $J_5$ are shown in FIGS. 6 and 7, FIG. 7 representing a second portion $CL_2$ of the logic control circuit. Portion $CL_1$ further comprises a pulse generator $G_2$ triggered by the signal $\overline{J}$ and providing a pulse of a duration $t_3 = 2.93$ msec approximately.

Figure 8:
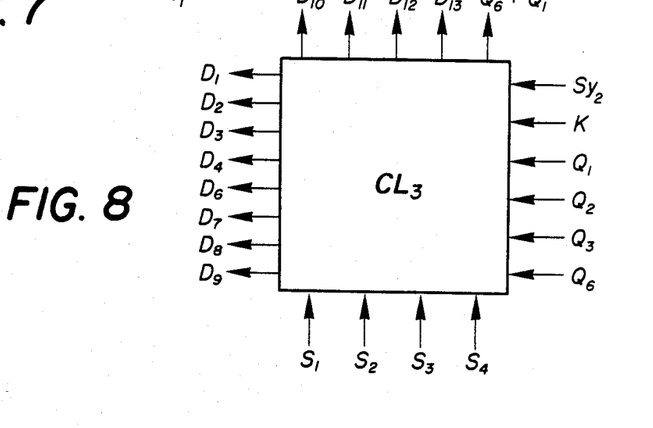
FIG. 8 is a block diagram of another part of the device of FIG. 4.

FIG. 8 shows schematically a third portion of the logic control circuit namely the logic unit $CL_3$ which receives at its inputs the signals $S_1$ to $S_4$ as well as signals $Q_1$, $Q_2$, $Q_3$, $Q_6$, K and $Sy_2$ appearing at the corresponding outputs of portions $CL_1$ and $CL_2$. Unit $CL_3$ is adapted to provide at its outputs the following control signals defined by the logic equations given hereafter:

$$D_1 = \overline{Sy_2 \cdot S_1}$$

$$D_2 = S_4 + \overline{Q}_1 S_2 + Sy_2 S_3 + Q_2 + \overline{K} S_1$$

$$D_3 = \overline{Sy_2 \cdot S_3}$$

$$D_4 = S_2 + \overline{Q}_1 + S_4 + Sy_2 S_1 + Q_2 + \overline{K} S_3$$

$$D_6 = \overline{Sy_2 \cdot S_2}$$

$$D_7 = S_1 + \overline{Q}_1 S_3 + Sy_2 S_4 + Q_3 + \overline{K} S_2$$

$D_8 = \overline{S_{y2} \cdot S_4}$ $D_9 = S_3 + \overline{Q}_1 S_1 + S_{y2} S_2 + Q_3 + \overline{K} S_4$ $D_{10} = S_3 Q_1 + \overline{Q}_1 S_4$ $D_{11} = S_2 Q_1 + \overline{Q}_1 S_3$ $D_{12} = S_4 Q_1 + \overline{Q}_1 S_1$ $D_{13} = S_1 Q_1 + \overline{Q}_1 S_2$ $Q_6 + \overline{Q_1}$ The control signal rs for resetting the integrator I is obtained at one output of $CL_1$ as shown in FIG. 6.

It is to be noted that diagrams of FIGS. 5 to 8, given by way of example, correspond to a realization of the circuits in partially discrete form while, of course, those circuits are preferably realized as practically entirely integrated circuits for large series production.

Figure 9:
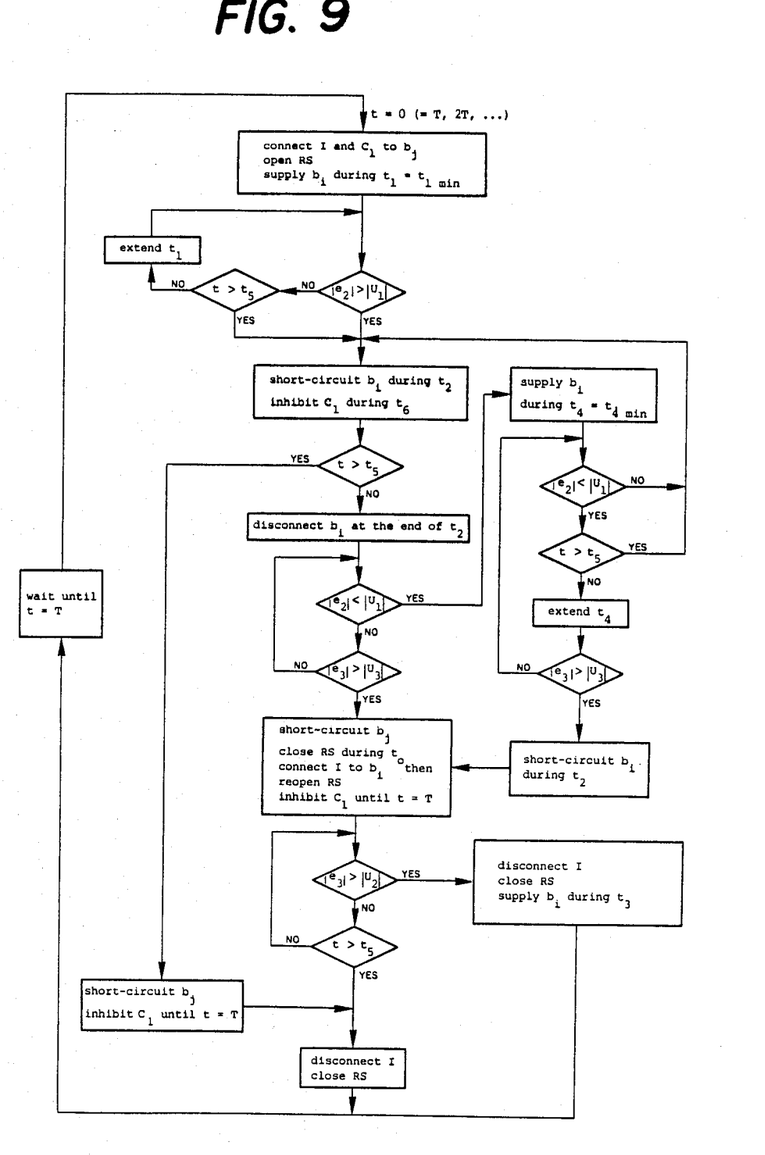
FIG. 9 is a flow-chart describing the operation of the device of FIG. 4.

The operation of the control device according to FIGS. 4 to 8 can be described by the flow-chart represented in FIG. 9. This flow-chart describes the various operations during a period T corresponding to one motor step.

In the following description it is considered that the starting instant is $t = 0$ and that $i = +1$ and $j = +2$. However, the general flow-chart is also applicable to starting instants which follow at multiple of the period T and to the corresponding state of states 1 to 4 of the control cycle.

At the instant $t = 0$, the rotor of the motor is at rest in the position $\alpha_0$ of FIG. 3. The integrator I and the comparator $C_1$ are connected to coil $b_2$; the reset device RS is open so that the integrator is ready for operation. In this state coil $b_1$ is supplied with a driving control pulse during a period $t_1$ equal to the minimum duration $t_{1min}$ which would be sufficient for a normal motor to have the rotor effect one step. During this period, comparator $C_1$ compares the absolute value of $e_2$, $|e_2|$, to the absolute value of $U_1$, $|U_1|$, representing a speed reference value. If this value is not reached, the duration of driving pulse $t_1$ is extended until the absolute value of $e_2$ is equal to the absolute value of $U_1$, which means that the rotor speed is then sufficient to effect one step. If this condition is not realized within the period $t_5$ which is the maximum time allowed, the motor does not operate correctly.

At the end of the above described checking of the rotor speed, coil $b_1$ is short-circuited during a period $t_2$ to allow its self-inductance energy to dissipate. If the time limit $t_5$ is reached at this stage, coil $b_2$ is also short-circuited and comparator $C_1$ is inhibited until $t = T$. Integrator I is disconnected and reset to zero by closing the switch of device RS. A new attempt at the time $t = T$ will in this case also be without success and the motor remains out of operation.

In the case of normal operation, the current time t is still quite in advance of $t_5$ at this stage and $C_1$ is only inhibited during an interval $t_6$ longer than $t_2$ to avoid that the induced voltage provides an erroneous information of the rotor speed since it is strongly affected at this time by the self-inductance and the mutual inductance of the coils.

After having been short-circuited during the period $t_2$, the coil $b_1$ has been disconnected. When the comparator $C_1$ is again ready for use after the period $t_6$ it checks whether the rotor speed is still greater than the value corresponding to $U_1$. Comparator $C_3$ which receives the output voltage of the integrator, $e_3$, compares the same with a position reference value $U_3$. This value is reached when the rotor has advanced substantially beyond the unstable equilibrium position $\alpha_0 + \pi/4N$ and has reached for instance the point A indicated in FIG. 3.

When the absolute value of $e_2$, $|e_2|$, remains greater than the absolute value of $U_1$, $|U_1|$, until the time at which the absolute value of $e_3$, $|e_3|$, reaches the absolute value of $U_3$, $|U_3|$, the operation is entirely normal and the output signal $c_3$ of comparator $C_3$ produces the short-circuiting of coil $b_2$ and thus dampens the movement. It also triggers the resetting to zero of the integrator during the time just necessary, $t_0$, and subsequently the connection of the integrator on coil $b_1$ and the reopening of the switch of the reset device RS. Comparator $C_1$ is inhibited until the end of the sequence, i.e. until $t = T$. It is now comparator $C_2$ which compares the integral of the electromotive force induced in coil $b_1$ in order to check the position of the rotor at the end of the step. Coil $b_1$ is used for this checking since the flux $\phi_{a1}$ is maximum at the stable equilibrium position $\alpha_0 + \pi/2N$ while the flux $\phi_{a2}$ in coil $b_2$ crosses zero at the end of the step, as shown in FIG. 3.

If the rotor is not dampened in the vicinity of the position $\alpha_0 + \pi/2N$ and continues its rotation until the position B of FIG. 3, i.e. $\alpha_0 + 3\pi/4N$, there is a risk that it will effect a further step and thus advance two steps at one time. This can occur even if the rotor speed is small for instance in the case of a relatively small detent torque in the vicinity of the following equilibrium position $\alpha_0 + \pi/N$. It is thus necessary to check the position of the rotor and not only the speed of the same.

If $|e_3|$ becomes greater than the position reference value $|U_2|$ before the end of the period of feedback control, in other words as long as t is less than $t_5$, the integrator is disconnected from coil $b_1$ and reset to zero, and coil $b_1$ is supplied during period $t_3$. The supply current flows in the same direction as the current having produced the driving torque but since the torque $Cn_{i1}$ is negative beyond the stable equilibrium position $\alpha_0 + \pi/2N$ as shown in FIG. 3, the supply of current in the same direction during $t_3$ produces a breaking of the rotor. The rotor will thus stabilize in the desired rest position $\alpha_0 + \pi/2N$, the feedback control is terminated and the control device does not operate until a new sequence starts, i.e. until $t = T$.

In the case that the rotor speed had become smaller than the speed corresponding to reference value $U_1$ after the end of the first driving pulse of duration $t_1$, i.e. that $|e_2| < |U_1|$ before the position A is reached, i.e. before $|e_3| = |U_3|$, coil $b_1$ is again supplied with a driving pulse of a minimum duration $t_{4min}$. If that duration is still not sufficient, which means that $|e_2|$ remains smaller than $|U_1|$, the duration $t_4$ of the new driving pulse is extended until the passage of the rotor through position A, as indicated by comparator $C_3$. At the end of this driving pulse, coil $b_1$ is short-circuited during $t_2$ in the same way as after the first driving pulse, and the checking of the final position of the rotor with if necessary the generation of a breaking pulse takes place as in the normal case. The feedback control will in any case terminate at the time $t = t_5$ and will start again with the occurence of a new clock pulse.

The control device according to the invention described herein in connection with a diphase motor can be applied in a similar way to a polyphase motor provided that at least one of the phases is not supplied with driving current at the same time as the other phases so that the coils associated to the unsupplied phase can be used as detecting coils for the electro-motive force induced by the rotor movement.

We claim:

1. A control device for a diphase or polyphase stepper motor of the type comprising a permanent magnet rotor and at least two separate magnetic stator circuits each coupled with at least one electric coil ($b_i$, $b_j$), said control device comprising a source of electrical energy (V) adapted to be connected through a commutation circuit (CC) to the respective coils of each of the said separate stator circuits for supplying said coils with current pulses, a pulse generator circuit (PG) controlled by a clock signal source ($G_1$) for providing programmed control pulses ($S_1$ to $S_4$) being part of at least one programmed pulse series, a detection circuit (CD) at least one input of which is adapted to be connected through the said commutation circuit to the respective coils of each of the said separate stator circuits, said detection circuit comprising at least one integrating circuit (I) provided with a reset device (RS), at least a first comparator circuit ($C_3$) for comparing, at least temporarily, the output signal ($C_3$) of the said integrator circuit with a first position reference value ($U_3$) and providing a corresponding output signal, and a logic control circuit ($CL_1$, $CL_2$, $CL_3$) connected by its inputs to said clock signal source, to said pulse generator circuit and to the outputs of said detection circuit, said logic control circuit being arranged to supply through its outputs commutation control signals ($D_1$ to $D_4$, $D_6$ to $D_{13}$) to the inputs of said commutation circuit and detection control signals (rs, $Q_6 + \overline{Q_1}$) to said detection circuit, said detection circuit further comprising at least a second comparator circuit ($C_1$) for comparing, at least temporarily, a speed signal ($e_2$) provided by said electric coils with a speed reference value ($U_1$), said logic control circuit being further arranged to control the commutation circuit in accordance with said output signals of said comparator circuits so as to supply at determined times driving current pulses of determined duration to the motor in accordance with a desired mode of operation of the motor.

2. A control device in accordance with claim 1, wherein said detection circuit comprises a third comparator circuit ($C_2$) adapted to compare the output signal ($e_3$) of the integrator circuit with a second position reference value ($U_2$), the logic control circuit being arranged for controlling the commutation circuit to supply the motor, if necessary, at given times by breaking current pulses.

3. A control device in accordance with claim 2, wherein the logic control circuit comprises a plurality of devices for defining the periods $t_0$, $t_2$, $t_3$, $t_{4min}$, $t_5$, $t_6$, the clock pulses having a duration $t_{1min}$ and a period T and the following relations existing between the durations of said periods: $t_0 + t_{1min} + t_2 + t_3 + t_{4min} + 2t_6 < t_5 < T$ and $t_2 < t_6$, and wherein further the control device as a whole is adapted to operate as a function of time t in accordance with the flow-chart of FIG. 9 in which $b_i$ and $b_j$ designate respectively the coils associated with each of the two phases, I designates said integrator circuit and RS designates the reset device for said integrator circuit, $C_1$ designates the second comparator circuit, $e_2$ designates the speed signal and $e_3$ said output signal of the integrator circuit and $U_1$, $U_2$ and $U_3$ designate respectively said reference values of the second, third and first comparator circuits, namely said speed reference value and said second and first position reference values.

* * * * *